(12) United States Patent
Gargalaka et al.

(10) Patent No.: US 10,272,650 B2
(45) Date of Patent: Apr. 30, 2019

(54) POLYOLEFIN BASED LAMINATED STRUCTURES WITH ELASTIC PROPERTIES

(71) Applicant: Dow Global Technologies LLC, Midland, MI (US)

(72) Inventors: João Gargalaka, Jundiai/São Paulo (BR); Nicolas C. Mazzola, Jundiai/São Paulo (BR); Jorge C. Gomes, Santo Amaro/São Paulo (BR)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/763,675

(22) PCT Filed: Sep. 20, 2016

(86) PCT No.: PCT/US2016/052635
§ 371 (c)(1),
(2) Date: Mar. 27, 2018

(87) PCT Pub. No.: WO2017/058572
PCT Pub. Date: Apr. 6, 2017

(65) Prior Publication Data
US 2018/0272667 A1 Sep. 27, 2018

Related U.S. Application Data

(60) Provisional application No. 62/235,272, filed on Sep. 30, 2015.

(51) Int. Cl.
*B32B 27/08* (2006.01)
*B32B 27/40* (2006.01)
(Continued)

(52) U.S. Cl.
CPC ........... *B32B 27/08* (2013.01); *B32B 7/12* (2013.01); *B32B 27/32* (2013.01); *B32B 27/40* (2013.01);
(Continued)

(58) Field of Classification Search
CPC ............ B32B 27/40; Y10T 428/2848; Y10T 428/2852; Y10T 428/2891; Y10T 428/2896
See application file for complete search history.

(56) References Cited

U.S. PATENT DOCUMENTS

| 5,032,463 A | 7/1991 | Smith |
| 6,534,137 B1 | 3/2003 | Vadhar |

(Continued)

FOREIGN PATENT DOCUMENTS

| EP | 0687558 A2 | 12/1995 |
| EP | 0780214 A1 | 6/1997 |

(Continued)

OTHER PUBLICATIONS

Pegoretti, Investigation of Nonelastic Response of Semicrystalline Polymers at High Strain Levels, Journal of Applied Polymer Science, 2000, vol. 78, 1664-1670, John Wiley & Sons, Inc.

(Continued)

*Primary Examiner* — Betelhem Shewareged
(74) *Attorney, Agent, or Firm* — Dinsmore & Shohl LLP

(57) ABSTRACT

Embodiments of laminated structures include a first film comprising a first polyolefin; an intermediate layer comprising a laminate adhesive, and a second film comprising a second polyolefin. The laminated structures exhibit excellent elastic recovery properties, ensuring that the laminated structure can adapt and hold to the shape of the packaged product.

14 Claims, 7 Drawing Sheets

(51) Int. Cl.
*B32B 7/12* (2006.01)
*B32B 27/32* (2006.01)

(52) U.S. Cl.
CPC ... *B32B 2270/00* (2013.01); *B32B 2307/4023* (2013.01); *B32B 2307/51* (2013.01); *B32B 2439/46* (2013.01); *B32B 2439/70* (2013.01); *Y10T 428/2848* (2015.01); *Y10T 428/2852* (2015.01); *Y10T 428/2891* (2015.01); *Y10T 428/2896* (2015.01)

(56) References Cited

U.S. PATENT DOCUMENTS

| | | | |
|---|---|---|---|
| 2003/0091801 A1* | 5/2003 | Mizuno | B32B 27/08 428/212 |
| 2003/0123719 A1* | 7/2003 | Kurahashi | G06F 19/321 382/131 |
| 2018/0272667 A1* | 9/2018 | Gargalaka | B32B 7/12 |

FOREIGN PATENT DOCUMENTS

| | | |
|---|---|---|
| EP | 1362793 A2 | 11/2003 |
| GB | 2154178 A | 1/1985 |
| WO | 9417113 A1 | 8/1994 |
| WO | 9428066 A2 | 12/1994 |
| WO | 2004012938 A1 | 2/2004 |
| WO | 2006101930 A2 | 9/2006 |
| WO | 2009094506 A1 | 7/2009 |
| WO | 2012003510 A1 | 1/2012 |
| WO | 2014081516 A1 | 5/2014 |
| WO | 2014172350 A1 | 10/2014 |

OTHER PUBLICATIONS

Ricco, Energy Storage and Strain-Recovery Processes in Highly Deformed Semicrystalline Poly(butylene terephthalate), Journal of Polymer Science, 2002, vol. 40, 236-243.
Tian, Indentation of shape memory polymers: Characterization of thermomechanical and shape recovery properties. Polymer, 2013, vol. 54, 1405-1414, Elsevier.
Zitzumbo, Laser technology application: Deformation and elastic recovery of semi-crystalline polymers, European Polymer Journal, 2006, vol. 42, 1298-1304.
International Search Report PCT/US2016/052635 dated Aug. 23, 2016.
International Preliminary Report on Patentability PCT/US2016/052635 dated Sep. 20, 2016.
Written Opinion PCT/US2016/052635 dated Sep. 30, 2016.

* cited by examiner

POLYOLEFIN BASED LAMINATED STRUCTURES WITH ELASTIC PROPERTIES

CROSS-REFERENCE TO RELATED APPLICATION

This application claims priority to U.S. Provisional Patent Application Ser. No. 62/235,272 filed Sep. 30, 2015, which is incorporated by reference herein in its entirety.

TECHNICAL FIELD

Embodiments described herein relate generally to laminated structures with elastic properties, and more particularly to polyolefin based laminated structures that exhibit excellent elastic recovery. Such polyolefin based laminated structures can be used as alternative packaging to thermo-shrink bags, while providing enhanced appearance and printing protection.

BACKGROUND

Currently, a significant amount of food products, including fresh meat, frozen poultry and cheese products, are packaged in thermo-shrink bags. Thermo-shrink bags are produced by a bi-oriented extrusion process. This process creates a thermal memory that allows the bag to shrink to the size of the product when the bag is exposed to heat. During the initial packaging process, the size of the bag is larger than the food product to be packaged. The bag is sealed after removing the air in a vacuum-sealing system. The bags are subsequently passed through a hot vapor tunnel or hot water bath in order to promote shrinkage.

The key characteristic of these thermo-shrink bags is that they are able to hold the shape of the product. However, the bi-oriented extrusion process used to make thermo-shrink bags is expensive and, due to the shrinkage step, time consuming. Additionally, while thermo-shrink bags made by a bi-oriented extrusion process allow for printing, the printed layer is externally exposed on the outside of the package and not properly protected. Thus, there is a need in the art for alternative structures that allow for both improved protection of printed layers and appearance, while also exhibiting the necessary elastic recovery properties so that the structure can adapt and hold to the shape of the packaged product. Furthermore, the process used to create such alternative packaging structures would ideally be more economical and efficient than the bi-oriented extrusion process used for producing thermo-shrink bags.

SUMMARY

Embodiments of the present disclosure meet those needs by providing laminated structures comprising (a) a first film comprising a first polyolefin; (b) an intermediate layer comprising a laminate adhesive; and (c) a second film comprising a second polyolefin. The laminated structures may be used as packaging, and more particularly as packaging for food products. Even more particularly, the laminated structures can be used as packaging for frozen food products. The laminated structures exhibit excellent elastic recovery properties, ensuring that the laminated structure can adapt and hold to the shape of the packaged product. Furthermore, the laminated structures can allow for the improved protection of printed layers and improved appearance as compared to thermo-shrink bags.

According to one embodiment of the present disclosure, a laminated structure is provided. The laminated structure comprises: (a) a first film comprising a first polyolefin; (b) an intermediate layer comprising a laminate adhesive; and (c) a second film comprising a second polyolefin. The laminated structure exhibits an elastic recovery greater than 80% in both the cross direction and the machine direction for 15% of strain, greater than 70% in both the cross direction and the machine direction for 50% strain, and greater than 50% in both the cross direction and the machine direction for 100% strain when measured at room temperature according to ASTM D5459. The laminated structure has a delamination force greater than 300 Win when measured at 23° C. according to ASTM F904.

These and other embodiments are described in more detail in the Detailed Description.

DETAILED DESCRIPTION

Figure 1:
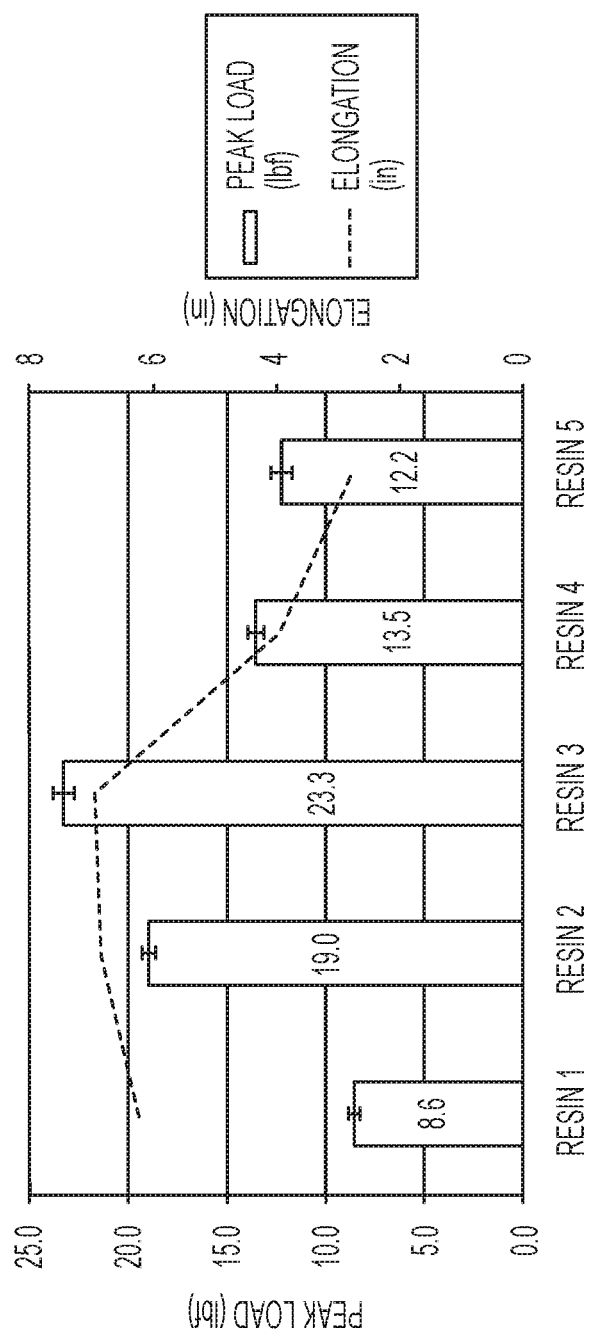
FIG. 1 is a bar chart depicting the puncture resistance for the monolayer film structures of Table 2 below.

Reference will now be made in detail to various embodiments of the instantly-disclosed coated structures. The components of the presently disclosed laminated structure include: (a) a first film comprising a first polyolefin; (b) an intermediate layer comprising a laminate adhesive; and (c) a second film comprising a second polyolefin. The laminated structures can be used as packaging, such as food packaging. More particularly, the laminated structures can be used for frozen food. Embodiments of the laminate structure may provide advantages over prior food packaging, such as thermo-shrink bags. Importantly, the instantly-disclosed laminated structures exhibit excellent elastic recovery properties, as well as improved protection of printed layers and improved appearance as compared to thermo-shrink bags.

Unless otherwise indicated, the disclosure of any ranges in the specification and claims are to be understood as including the range itself and also anything subsumed therein, as well as endpoints.

In various embodiments, a laminated structure includes: (a) a first film comprising a first polyolefin; (b) an intermediate layer comprising a laminate adhesive; and (c) a second film comprising a second polyolefin. In various embodiments, the lamination adhesive is located between the first and second film. In some embodiments, the lamination adhesive is in direct contact and adheres the first film and the second film. For example, the lamination adhesive can be located between and in direct contact with the first film and second film, without any intervening coatings or layers being applied between the lamination adhesive and the first and second film.

In some embodiments, the laminated structure exhibits an elastic recovery greater than 80% in both the cross direction and the machine direction for 15% of strain, greater than 70% in both the cross direction and the machine direction for 50% strain, and greater than 50% in both the cross direction and the machine direction for 100% strain when measured at room temperature according to ASTM D5459. In other embodiments, the laminated structure exhibits an elastic recovery greater than 85% in both the cross direction and the machine direction for 15% of strain, greater than 80% in both the cross direction and the machine direction for 50% strain, and greater than 60% in both the cross direction and the machine direction for 100% strain when measured at room temperature according to ASTM D5459. In further embodiments, the laminated structure exhibits an elastic recovery greater than 90% in both the cross direction and the machine direction for 15% of strain, greater than 85% in both the cross direction and the machine direction for 50% strain, and greater than 60% in both the cross direction and the machine direction for 100% strain when measured at room temperature according to ASTM D5459.

In some embodiments, the laminated structure has a delamination force greater than 300 W/in when measured at 23° C. according to ASTM F904. In other embodiments, the laminated structure has a delamination force greater than 500 W/in when measured at 23° C. according to ASTM F904. In even further embodiments, the laminated structure has a delamination force greater than 800 W/in when measured at 23° C. according to ASTM F904.

In some embodiments, the laminated structure exhibits a load at initial strain of greater than 0.5 lbf and less than 10.0 lbf in both the cross direction and the machine direction for 15% strain, 50% strain, and 100% strain when measured at room temperature according to ASTM D5459. In other embodiments, the laminated structure exhibits a load at initial strain of greater than 2.0 lbf and less than 5.0 lbf in both the cross direction and the machine direction for 15% strain, 50% strain, and 100% strain when measured at room temperature according to ASTM D5459. In further embodiments, the laminated structure exhibits a load at initial strain of greater than 2.0 lbf and less than 4.0 lbf in the cross direction for 15% strain, 50% strain, and 100% strain, and exhibits a load at initial strain of greater than 2.0 lbf and less than 5.0 lbf in the machine direction for 15% strain, 50% strain, and 100% strain when measured at room temperature according to ASTM D5459. The load at initial strain, in combination with the elastic recovery, is extremely important for a successful packaging process. If the load at initial strain is too high, the mechanism that opens the package will be overloaded. If the load at initial strain is too low, the package will have too low of grips to the opening plates of the packaging machine.

In some embodiments, the first and/or second film is a monolayer film. In other embodiments, the first and/or second film is a multilayer film. These films may be blown films or cast film extrusions. The multilayer films may be produced by coextruding the multiple layers using machinery and processes known for multiple layer extrusions. In certain embodiments, the multilayer films are produced using a monolayer extrusion. In other embodiments, the multilayer films are produced using a coextrusion.

In various embodiments, the films can include 1-9 layers. In many instances, the application of the laminated structure may dictate the number of layers to be used. In certain embodiments, the first and/or second film can have a thickness of about 10 to about 250 microns. In other embodiments, the first and/or second film can have a thickness of about 15 to about 100 microns. In further embodiments, the first and/or second film can have a thickness of about 20 to about 40 microns.

In some embodiments, the first film and the second film exhibit an elastic recovery greater than 80% in both the cross direction and the machine direction for 15% of strain, greater than 70% in both the cross direction and the machine direction for 50% strain, and greater than 65% in both the cross direction and the machine direction for 100% strain when measured at room temperature according to ASTM D5459. In other embodiments, the first film and the second film exhibit an elastic recovery greater than 85% in both the cross direction and the machine direction for 15% of strain, greater than 80% in both the cross direction and the machine direction for 50% strain, and greater than 65% in both the cross direction and the machine direction for 100% strain when measured at room temperature according to ASTM D5459. In further embodiments, the first film and the second film exhibit an elastic recovery greater than 90% in both the cross direction and the machine direction for 15% of strain, greater than 85% in both the cross direction and the machine direction for 50% strain, and greater than 65% in both the cross direction and the machine direction for 100% strain when measured at room temperature according to ASTM D5459. Without being bound by theory, as can be seen from the elastic recovery properties of the laminated structures above, the presently-disclosed laminated structures exhibit similar elastic recovery to the individual films, while also providing increased improved protection of printed layers and improved appearance due to the lamination.

In other embodiments, the first film and the second film exhibit a load at initial strain of greater than 0.5 lbf and less than 10.0 lbf in both the cross direction and the machine direction for 15% strain, 50% strain, and 100% strain when measured at room temperature according to ASTM D5459. In other embodiments, the first film and the second film exhibit a load at initial strain of greater than 0.5 lbf and less than 5.0 lbf in both the cross direction and the machine direction for 15% strain, 50% strain, and 100% strain when measured at room temperature according to ASTM D5459. Without being bound by theory, as can be seen from the load at initial strain of the laminated structures above, the presently-disclosed laminated structures exhibit similar or better load at initial strain than the individual films, while also providing increased improved protection of printed layers and improved appearance due to the lamination.

In certain embodiments, the first polyolefin of the first film and second polyolefin of the second film are the same polyolefin. In other embodiments, the first polyolefin of the first film and second polyolefin of the second film are different polyolefins.

In various embodiments, the first polyolefin and/or the second polyolefin include a polyethylene, for example, a polyethylene homopolymer, a polyethylene copolymer, or combinations thereof. In certain embodiments, the polyethylene of the first polyolefin and the polyethylene of the second polyolefin are the same polyethylene. In other embodiments, the polyethylene of the first polyolefin and the polyethylene of the second polyolefin are different polyethylenes.

In certain embodiments, the polyethylene of the first polyolefin and/or the polyethylene of the second polyolefin has a density from about 0.840 g/cm$^3$ to about 0.930 g/cm$^3$ according to ASTM D792 and a melt index ($I_2$) of less than 4.0 g/10 minutes according to ASTM 1238. In other embodiments, the polyethylene of the first polyolefin and/or the polyethylene of the second polyolefin has a density from about 0.860 g/cm$^3$ to about 0.920 g/cm$^3$ according to ASTM D792 and a melt index ($I_2$) of less than 2.0 g/10 minutes according to ASTM 1238. In even further embodiments, the polyethylene of the first polyolefin and/or the polyethylene of the second polyolefin has a density from about 0.860 g/cm$^3$ to less than 0.920 g/cm$^3$ according to ASTM D792 and a melt index ($I_2$) of less than 2.0 g/10 minutes according to ASTM 1238. In certain embodiments, the polyethylene of the first polyolefin and/or the polyethylene of the second polyolefin have a melt flow ratio of $I_{10}/I_2$ range from about 5 to about 32.

For example and not by way of limitation, polyethylenes that can be included in the polyolefin of the first film and/or the polyolefin of the second film may include ethylene α-olefin block copolymers, metallocene-catalyzed linear low density polyethylenes, metallocene-catalyzed ethylene propylene α-olefin copolymers, and low density polyethylene. Various commercially available polyethylenes are contemplated for the polyethylenes of the first and/or second films. For example, the polyethylene suitable for use may include, by way of example and not limitation, INFUSE™ 9007, VERSIFY™ 2200, and ELITE™ AT 6101, LDPE 203M, and LPDE 206M all available from The Dow Chemical Company, Midland Mich.

In some embodiments, the first film and/or the second film comprises a blend of linear low density polyethylene and low density polyethylene. In some embodiments, the first film and/or the second film can comprise a blend including from about 0% to about 30% low density polyethylene and from about 70% to about 100% linear low density polyethylene. In certain embodiments, the first film and/or the second film can comprise a blend including from about 0% to about 10% low density polyethylene and from about 90% to about 100% linear low density polyethylene. In other embodiments, the first film and/or the second film can comprise a blend including from about 0% to about 5% low density polyethylene and from about 95% to about 100% linear low density polyethylene.

The first film and/or second film may include additional resins used as secondary materials. Such resins can include, by way of example and not limitation, ethylene-vinyl acetate, ethylene vinyl alcohol, polyamide, polyvinylidene chloride, polypropylene, and linear low density polyethylene grafted maleic anhydride. Such resins can be coextruded with the present monolayer or multilayer films. By way of example and not limitation, ethylene vinyl alcohol can be included as an oxygen barrier material. Such additional resins can be included in the same layer as the first and/or second film, or can be included as separate layers.

In various embodiments, the laminate adhesive comprises a solvent-less laminate adhesive or a solvent-based laminate adhesive. In various embodiments, the laminate adhesive comprises a water based laminate adhesive. In certain embodiments, the laminate adhesive has a weight per square meter of about 0.5 g/m$^2$ to about 5 g/m$^2$, more preferably from about 1 g/m$^2$ to about 3 g/m$^2$. The laminate adhesive can be applied to the first and second film in any suitable manner. For example, the methods of the present disclosure may include, by way of example and not limitation, the use of a laminating machine, gravure coating, roll coating, wire rod coating, flexographic printing, spray coating, screen printing, and the like. As stated above, in various embodiments, the lamination adhesive is located between the first and second film. In some embodiments, the lamination adhesive is in direct contact with the first film and the second film. For example, the lamination adhesive can be located between and in direct contact with the first film and second film, without any intervening coatings or layers being applied between the lamination adhesive and the first and second film. The films surfaces that will be coated with lamination adhesive can be corona treated to increase surface energy and provide enough wettability for the adhesive components.

In various embodiments, the laminate adhesive comprises a polyurethane. In one or more embodiments, the adhesive is a two component polyol and isocyanate mixture with optional components such as catalysts, diluents, etc. An exemplary solvent-less laminate bi-component adhesive includes a polyurethane that includes a first component that is an isocyanate terminated prepolymer. The second component of the polyurethane is a polyester/polyether that is made with linear and difunctional polyols. An exemplary solvent based laminate adhesive comprises a polyurethane that includes a first component that is a 100% polyester based with methyl ethyl ketone as a diluent. The second component is an isocyanate-terminated prepolymer. For example, the adhesives suitable for use may include, by way of example and not limitation, MOR-FREE™ 970/C83, MOR-FREE™ 970/CR137, MOR-FREE™ 980/CR85, and ADCOTE™ 545/F BR, all available from The Dow Chemical Company, Midland Mich.

In various embodiments, the laminate adhesive comprises an acrylic. An exemplary water based laminate adhesive includes an acrylic that is made from a combination of butyl acrylate, acrylic acid, methyl methacrylate, and ethyl acrylate monomers. In a specific embodiment, the acrylic may be a non-branched polymer. The water based laminate adhesive may include an acrylic having a pH from about 6 to about 7, and a viscosity from about 50 cps to about 150 cps. For example, an adhesive suitable for use may include, by way of example and not limitation, ROBOND™ L-90D, available from The Dow Chemical Company, Midland Mich.

In various embodiments, the laminate structure includes a toner or ink image printed on said first film. In certain embodiments, the top side of the first film (which is the side facing the laminate adhesive) is printed. In more particular embodiments, the printed, top side of the first film can be in direct contact with the laminate adhesive. The first film may be printed using machinery and processes known in the art. By way of example and not limitation, the first film may be printed by using corona printing, a digital press, and liquid toner/ink. The lamination adhesive may be applied to the printed first film surface prior to lamination to the second film. Thus, besides exhibiting the necessary elastic recovery properties so that the structure can adapt and hold to the shape of the packaged product, the instantly disclosed laminated structures provide improved protection of printed layers and improved appearance as compared to thermo-shrink bags.

In order that various embodiments may be more readily understood, reference is made to the following examples which are intended to illustrate various embodiments, but do not limit the scope thereof.

Example 1

The resins used for the production of the films are listed in Table 1 below.

TABLE 1

Resins used for film production

| Name | Commercial Name | Type | Melt Index (190° C. 2.16 kg) (g/10 min) | Density (g/cm³) |
|---|---|---|---|---|
| Resin 1 | INFUSE ™ 9007 | Ethylene α-olefin block-copolymer | 0.50 | 0.866 |
| Resin 2 | VERSIFY ™ 2200 | Ethylene propylene plastomer | 2.00 | 0.876 |
| Resin 3 | ELITE ™ AT 6101 | Linear low density polyethylene made with a post-metallocene catalyst | 0.80 | 0.905 |
| Resin 4 | DOWLEX ™ 2045G | Ziegler-Natta catalyzed linear low density polyethylene | 1.00 | 0.920 |
| Resin 5 | LDPE 206M | Low density polyethylene | 0.70 | 0.922 |

Film structures, which can include the resins of Table 1, are listed in Table 2 below. The 60 μm films can include the listed resins in three layers in the amounts listed in Table 2, which, for example can be coextruded. The films can comprise a blend of linear low density polyethylene and low density polyethylene. In certain embodiments, the films can also include additionally additives, such as slip agents and antiblock agents. Preferably, layers A and C of the film structures of Table 2 can include slip agents and antiblock agents. In certain embodiments, the film structures can include between 0% and about 3% of a slip agent. In certain embodiments, the film structures can include between about 0% and about 2% of an antiblock agent. For example, a slip agent suitable for use may include, by way of example and not limitation, AB 50035, available from Cromex, Sao Paulo, Brasil. Additionally, an antiblock agent for use may include, by way of example and not limitation, DL 50017, available from Cromex, Sao Paulo, Brasil. The films can be made in a Dr. Collin extruder, and are targeted to have a melting temperature for a good plastification of all resins and good bubble stability to provide very low thickness variation. During the extrusion process, the films are produced under blow up ratio (BUR) from about 1.0 to about 5.0, and more preferably from about 2.1 to about 4.0. The films of Table 2 were produced with a BUR of 3.0.

TABLE 2

Film structures

| Layers | A (12%) | B (76%) | C (12%) |
|---|---|---|---|
| Film Example 1 | Resin 3 (75%) Resin 5 (20%) Antiblock (2%) Slip Agent (3%) | Resin 1 (100%) | Resin 3 (75%) Resin 5 (20%) Antiblock (2%) Slip Agent (3%) |
| Film Example 2 | Resin 3 (75%) Resin 5 (20%) Antiblock (2%) Slip Agent (3%) | Resin 2 (100%) | Resin 3 (75%) Resin 5 (20%) Antiblock (2%) Slip Agent (3%) |
| Film Example 3 | Resin 3 (75%) Resin 5 (20%) Antiblock (2%) Slip Agent (3%) | Resin 3 (100%) | Resin 3 (75%) Resin 5 (20%) Antiblock (2%) Slip Agent (3%) |
| Film Example 4 | Resin 4 | Resin 4 | Resin 4 |
| Film Example 5 | Resin 5 | Resin 5 | Resin 5 |

The adhesives used for the production of the laminated structures are listed in Table 3 below.

TABLE 3

Adhesives used for the laminated structures

| Name | Commercial Name | Composition | Density (g/cm³) | Viscosity (cps) |
|---|---|---|---|---|
| Adhesive 1 | MOR-FREE ™ 970/C83 | Solvent-less polyurethane bi-component | MOR-FREE ™ 970 = 1.13/ MOR-FREE ™ C83 = 1.07 | MOR-FREE ™ 970 = 3000/ MOR-FREE ™ C83 = 2000 |
| Adhesive 2 | MOR-FREE ™ 970/CR137 | Solvent-less polyurethane bi-component | MOR-FREE ™ 970 = 1.13/ MOR-FREE ™ CR137 = 0.937 | MOR-FREE ™ 970 = 3000/ MOR-FREE ™ CR137 = 500 |
| Adhesive 3 | MOR-FREE ™ 980/CR85 | Solvent-less polyurethane bi-component | MOR-FREE ™ 980 = 1.14/ MOR-FREE ™ CR85 = 0.95 | MOR-FREE ™ 980 = 3500-6500/ MOR-FREE ™ CR85 = 500-900 |
| Adhesive 4 | ADCOTE ™ 545/F BR | Solvent based polyurethane bi-component | AD545 = 1.10/ F BR = 1.19 | AD545 = 6500/F BR = 1800 |
| Adhesive 5 | ROBOND ™ L-90D | Water based acrylic adhesive | L-90D = 1.06 | L-90D = <50 |

Laminated structures, which were made using two films comprising Film Example 3 (one film being 20 μm thick and the other film being 40 μm thick) and the listed lamination adhesives in Table 3, are listed in Table 4 below.

TABLE 4

Laminated film structures

| Layers | Film (20 μm) | Lamination Adhesive | Film (40 μm) |
|---|---|---|---|
| Laminated Example 1 | Film Example 3 | Adhesive 1 | Film Example 3 |
| Laminated Example 2 | Film Example 3 | Adhesive 2 | Film Example 3 |
| Laminated Example 3 | Film Example 3 | Adhesive 3 | Film Example 3 |
| Laminated Example 4 | Film Example 3 | Adhesive 4 | Film Example 3 |
| Laminated Example 5 | Film Example 3 | Adhesive 5 | Film Example 3 |

Example 2

The elastic recovery and load at initial strain properties were measured for all of the monolayer film structures of Table 2, and the results are presented in Table 5 below. The elastic recovery and the load at initial strain were both measured at room temperature according to ASTM D5459. Ideally, the elastic recovery should be greater than 80% in both the cross direction and the machine direction for 15% of strain, greater than 70% in both the cross direction and the machine direction for 50% strain, and greater than 65% in both the cross direction and the machine direction for 100% strain. Additionally, the load at initial strain should be greater than 0.5 lbf and less than 10.0 lbf in both the cross direction and the machine direction for 15% strain, 50% strain, and 100% strain. As can be seen, Film Examples 1-3 reached the required levels of elastic recovery and load at initial strain, and are therefore suitable films to be laminated with the described adhesive systems to form the instantly described laminated structures. In contrast, Film Examples 4 and 5 did not reach the required performance levels, particularly with regard to elastic recovery properties, and are therefore not suitable films for the instantly described laminated structures. This reinforces that the linear low density polyethylene component of the first and second films should most preferably have a density below 0.920 g/cm$^3$, and that the low density polyethylene component should be used as a minor phase, preferably lower than 30%, more preferably lower than 10%.

TABLE 5

Monolayer film elastic recovery and load at initial strain

| Name | Film Direction | Strain (%) | Elastic Recovery (%) | Load At Initial Strain (lbf) |
|---|---|---|---|---|
| Film example 1 | CD | 15 | 98.8 | 0.65 |
| | | 50 | 94.3 | 0.88 |
| | | 100 | 84.2 | 1.00 |
| | MD | 15 | 99.4 | 0.68 |
| | | 50 | 92.8 | 0.91 |
| | | 100 | 84.7 | 1.17 |
| Film example 2 | CD | 15 | 90.1 | 1.93 |
| | | 50 | 83.8 | 2.08 |
| | | 100 | 66.7 | 2.12 |
| | MD | 15 | 92.9 | 1.91 |
| | | 50 | 86.9 | 2.20 |
| | | 100 | 76.6 | 2.46 |
| Film example 3 | CD | 15 | 93.36 | 2.23 |
| | | 50 | 89.29 | 2.65 |
| | | 100 | 70.73 | 2.82 |
| | MD | 15 | 93.26 | 2.44 |
| | | 50 | 87.98 | 2.98 |
| | | 100 | 66.78 | 3.30 |
| Film example 4 | CD | 15 | 88.9 | 2.96 |
| | | 50 | 82.8 | 3.08 |
| | | 100 | 58.1 | 3.00 |
| | MD | 15 | 89.5 | 2.98 |
| | | 50 | 76.2 | 3.96 |
| | | 100 | 60.0 | 3.63 |
| Film example 5 | CD | 15 | 93.4 | 2.79 |
| | | 50 | 90.6 | 2.79 |
| | | 100 | 71.7 | 2.79 |
| | MD | 15 | 93.0 | 3.01 |
| | | 50 | 75.7 | 3.44 |
| | | 100 | 60.2 | 3.50 |

Figure 2:
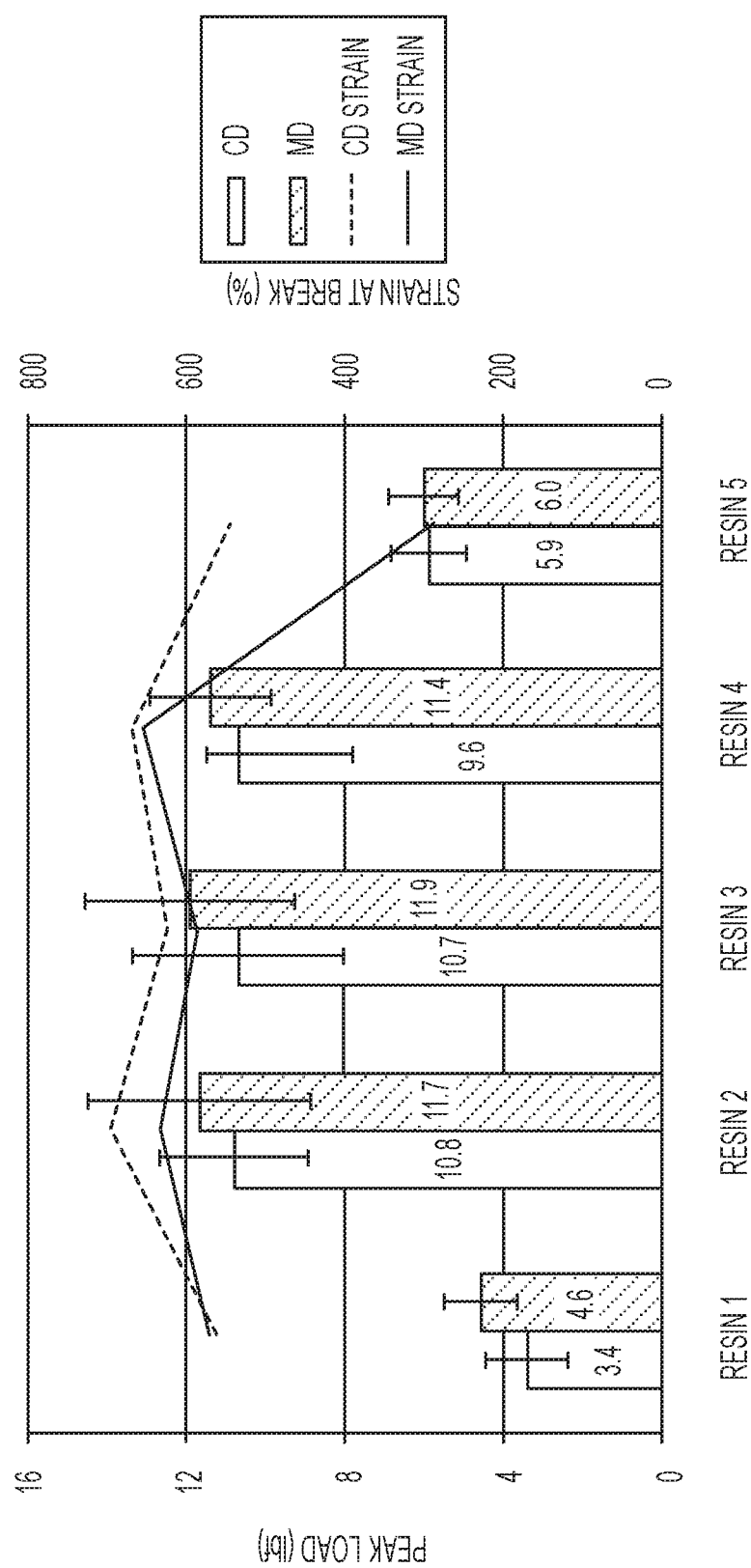
FIG. 2 is a bar chart depicting the tensile strength for the monolayer film structures of Table 2 below.
Figure 3:
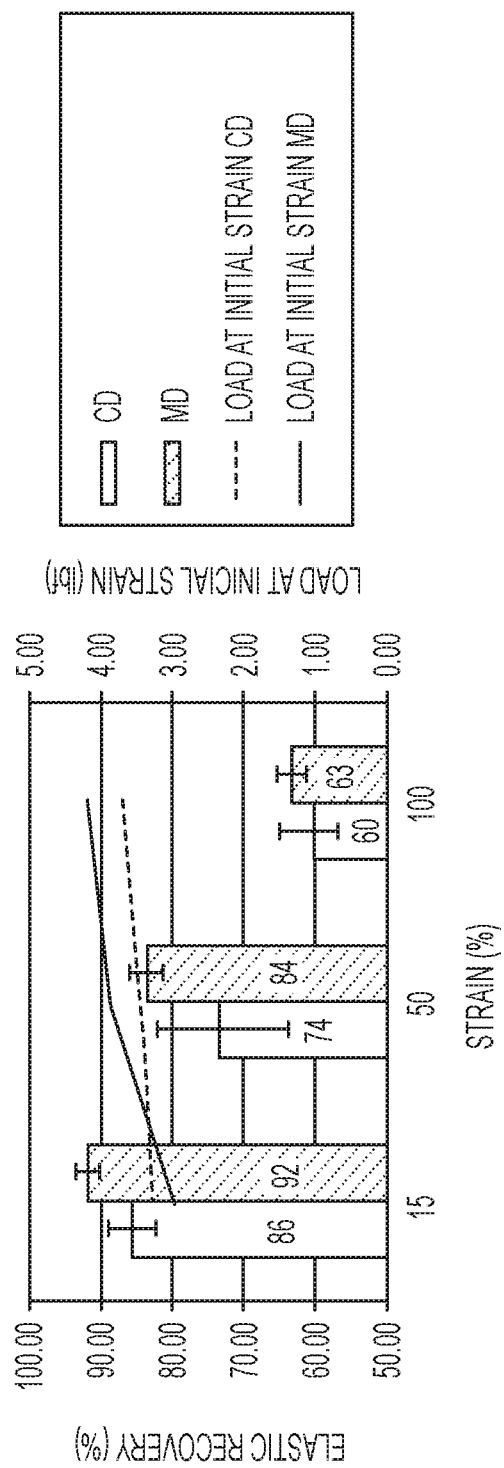
FIG. 3 is a bar chart depicting the elastic recovery and the load at initial strain of the laminated structure of Laminated Example 1 below, wherein both properties are measured at room temperature according to ASTM D5459, according to one or more embodiments of the present disclosure.
Figure 4:
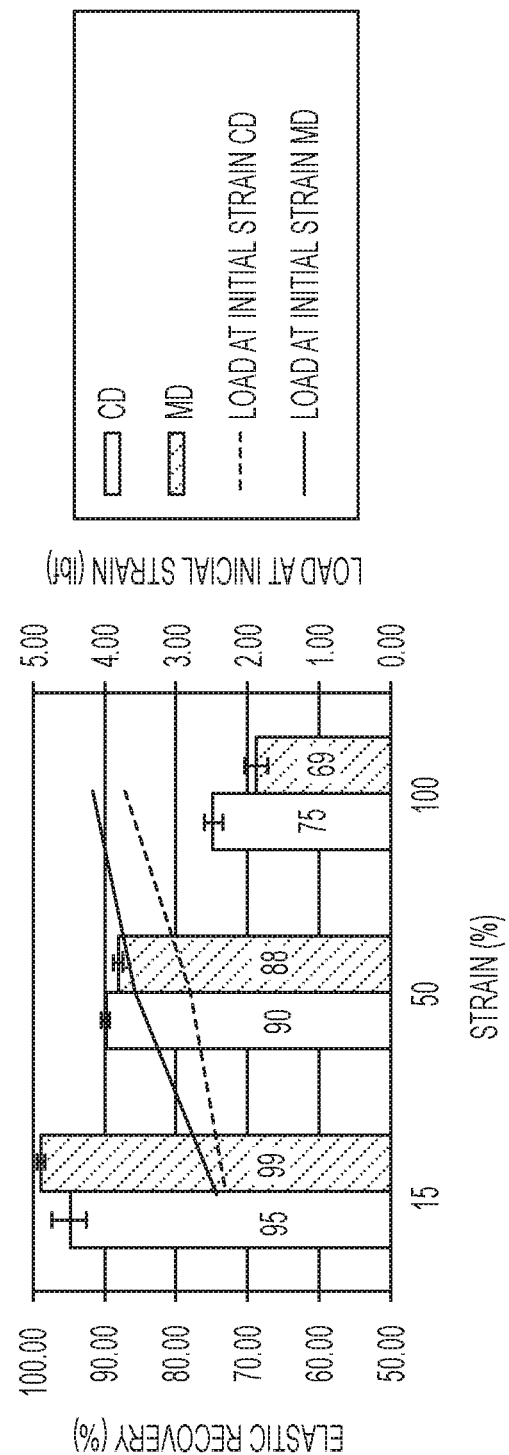
FIG. 4 is a bar chart depicting the elastic recovery and the load at initial strain of the laminated structure of Laminated Example 2 below, wherein both properties are measured at room temperature according to ASTM D5459, according to one or more embodiments of the present disclosure.
Figure 5:
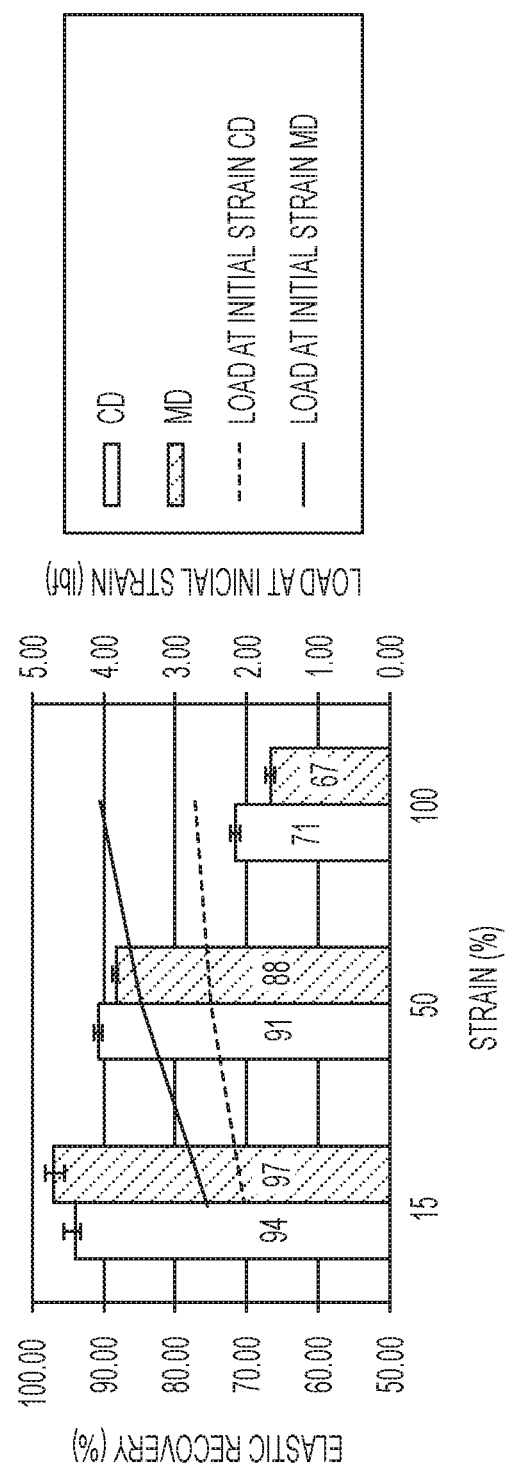
FIG. 5 is a bar chart depicting the elastic recovery and the load at initial strain of the laminated structure of Laminated Example 3 below, wherein both properties are measured at room temperature according to ASTM D5459, according to one or more embodiments of the present disclosure.
Figure 6:
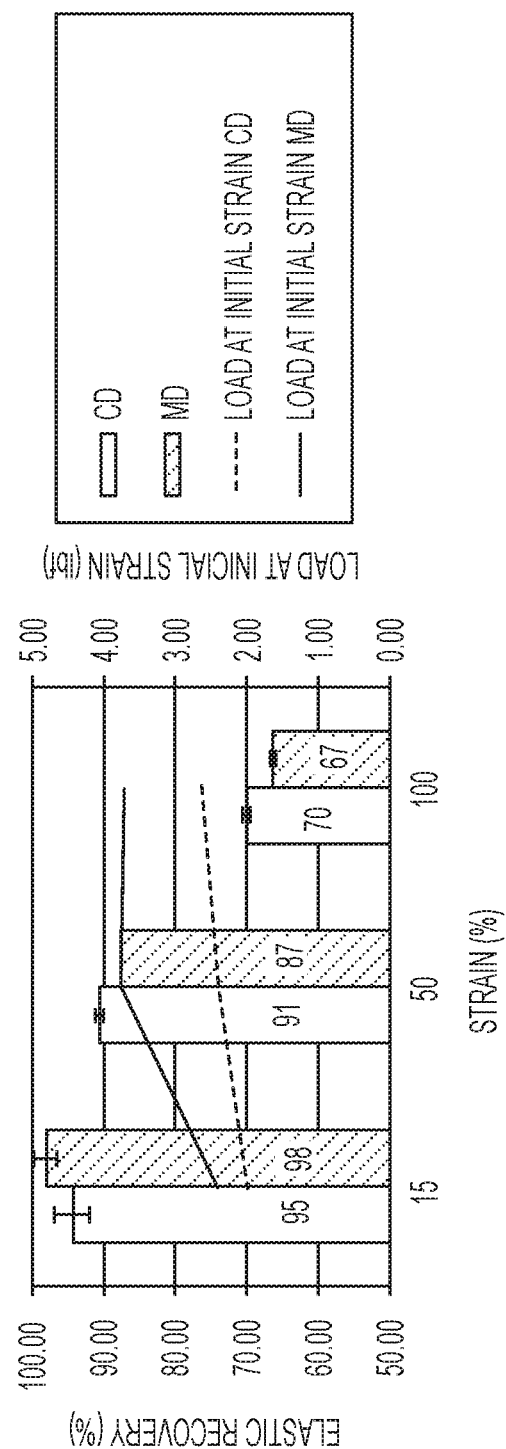
FIG. 6 is a bar chart depicting the elastic recovery and the load at initial strain of the laminated structure of Laminated Example 4 below, wherein both properties are measured at room temperature according to ASTM D5459, according to one or more embodiments of the present disclosure.
Figure 7:
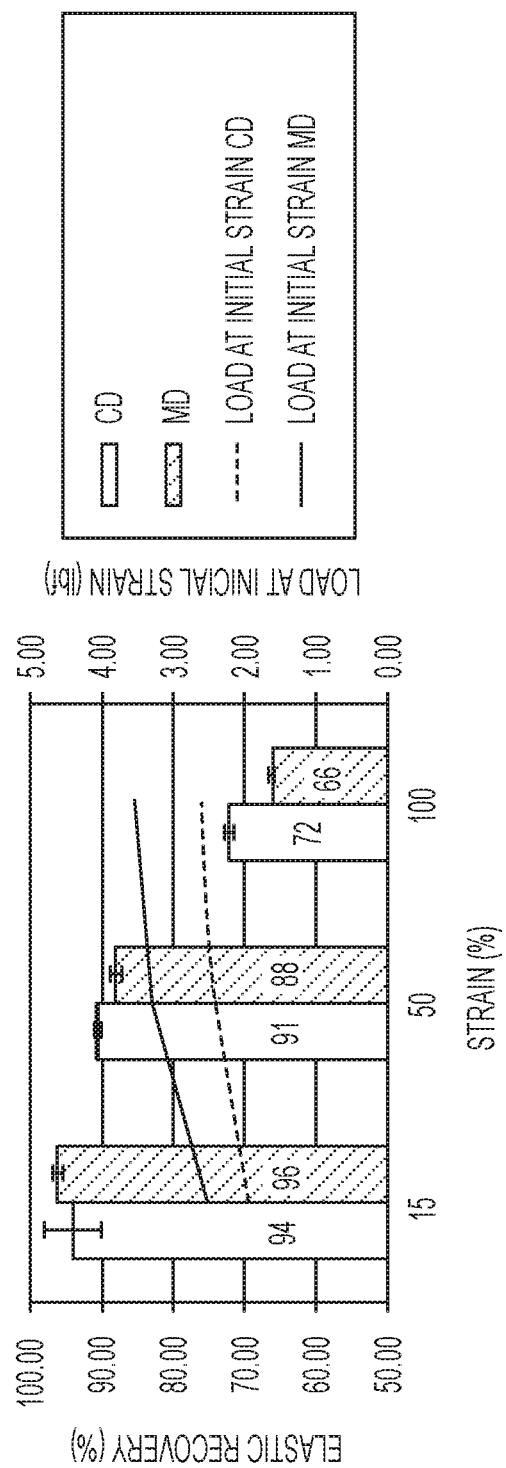
FIG. 7 is a bar chart depicting the elastic recovery and the load at initial strain of the laminated structure of Laminated Example 5 below, wherein both properties are measured at room temperature according to ASTM D5459, according to one or more embodiments of the present disclosure.

The puncture resistance and tensile strength were measured for all of the monolayer film structures of Table 2, and the results are presented in FIG. 1 and FIG. 2, respectively, according to ASTM D882 and D5748 respectively. As can be seen from FIG. 1 and FIG. 2, Film Example 3 demonstrated the highest puncture resistance and highest tensile strength.

Based on above measured performances for the monolayer film structures (Film Examples 1-5), different Film Examples can be used for different packaging purposes. For example, Film Example 1 is an option for the films of the laminated structure when high elastic recovery and low tensile strength is needed, and could be applied for products that have irregular shapes. Film Example 3 is an option for the films of the laminated structure when a medium elastic recovery performance (especially for 100% strain) and a high tensile strength is needed, and could be applied for products that have a more uniform shape and require excellent mechanical resistance. As described above, Film Examples 4 and 5 did not reach the required performance levels, particularly with regard to elastic recovery properties, and are therefore not suitable films for the instantly described laminated structures.

Example 3

The elastic recovery and load at initial strain properties were measured for all of the laminated structures of Table 4, and the results are presented in FIGS. 3-7. The elastic recovery and the load at initial strain were both measured at room temperature according to ASTM D5459. Ideally the elastic recovery should be greater than 80% in both the cross direction and the machine direction for 15% of strain, greater than 70% in both the cross direction and the machine direction for 50% strain, and greater than 50% in both the cross direction and the machine direction for 100% strain. Additionally, the load at initial strain should be greater than 0.5 lbf and less than 10.0 lbf in both the cross direction and the machine direction for 15% strain, 50% strain, and 100% strain. As can be seen, all laminated structures (examples 1-5) reached the required levels of elastic recovery and load at initial strain.

The laminate bond results (i.e. delamination force) were measured for all of the laminated structures of Table 4, and are the results are presented in Table 6 below. The delamination force was measured at 23° C. according to ASTM F904.

TABLE 6

| Description | Avg. Laminate Bond (g/in) |
| --- | --- |
| Laminated Example 1 | 1326.02 |
| Laminated Example 2 | 1397.22 |
| Laminated Example 3 | 821.18 |
| Laminated Example 4 | 505.38 |
| Laminated Example 5 | 1087.13 |

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A laminated structure comprising:
(a) a first film comprising a first polyolefin;
(b) an intermediate layer comprising a laminate adhesive; and
(c) a second film comprising a second polyolefin;
wherein the laminated structure exhibits an elastic recovery greater than 80% in both the cross direction and the machine direction for 15% of strain, greater than 70% in both the cross direction and the machine direction for 50% strain, and greater than 50% in both the cross direction and the machine direction for 100% strain when measured at room temperature according to ASTM D5459, and wherein the laminated structure has a delamination force greater than 300 g/in when measured at 23° C. according to ASTM F904, and wherein the laminate adhesive comprises a polyurethane or an acrylic.

2. The laminated structure according to claim 1, further comprising a toner or ink image printed on said first inner film layer.

3. The laminated structure according to claim 1, wherein the laminated structure exhibits a load at initial strain of greater than 0.5 lbf and less than 10.0 lbf in both the cross direction and the machine direction for 15% strain, 50% strain, and 100% strain when measured at room temperature according to ASTM D5459.

4. The laminated structure according to claim 1, wherein the first film and the second film exhibit an elastic recovery greater than 80% in both the cross direction and the machine direction for 15% of strain, greater than 70% in both the cross direction and the machine direction for 50% strain, and greater than 65% in both the cross direction and the machine direction for 100% strain when measured at room temperature according to ASTM D5459.

5. The laminated structure according to claim 1, wherein the first film and the second film exhibit a load at initial strain of greater than 0.5 lbf and less than 10.0 lbf in both the cross direction and the machine direction for 15% strain, 50% strain, and 100% strain when measured at room temperature according to ASTM D5459.

6. The laminated structure according to claim 1, wherein the first polyolefin, the second polyolefin, or both comprises a polyethylene.

7. The laminated structure according to claim 6, wherein the polyethylene has a density from about 0.840 g/cm$^3$ to about 0.930 g/cm$^3$ according to ASTM D792 and a melt index ($I_2$) of less than 4.0 g/10 minutes according to ASTM 1238.

8. The laminated structure according to claim 7, wherein the polyethylene has a density from about 0.8.60 g/cm$^3$ to about 0.920 g/cm$^3$ according to ASTM D792 and a melt index ($I_2$) of less than 2.0 g/10 minutes according to ASTM 1238.

9. The laminated structure according to claim 1, wherein the laminate adhesive is selected from the group consisting of a solvent-less laminate adhesive or a solvent based laminate adhesive.

10. The laminated structure of claim 1, wherein the laminate adhesive is water based.

11. The laminated structure according to claim 1, wherein the first film layer and/or the second film layer is a monolayer film.

12. The laminated structure according to claim 1, wherein the first film and/or the second film is a multilayer film.

13. The laminated structure according to claim 1, wherein the first film and/or the second film comprises a blend of linear low density polyethylene and low density polyethylene.

14. The laminated structure according to claim 1, wherein the first film and the second film each have a thickness of about 10 to about 250 microns.

* * * * *